UNITED STATES PATENT OFFICE.

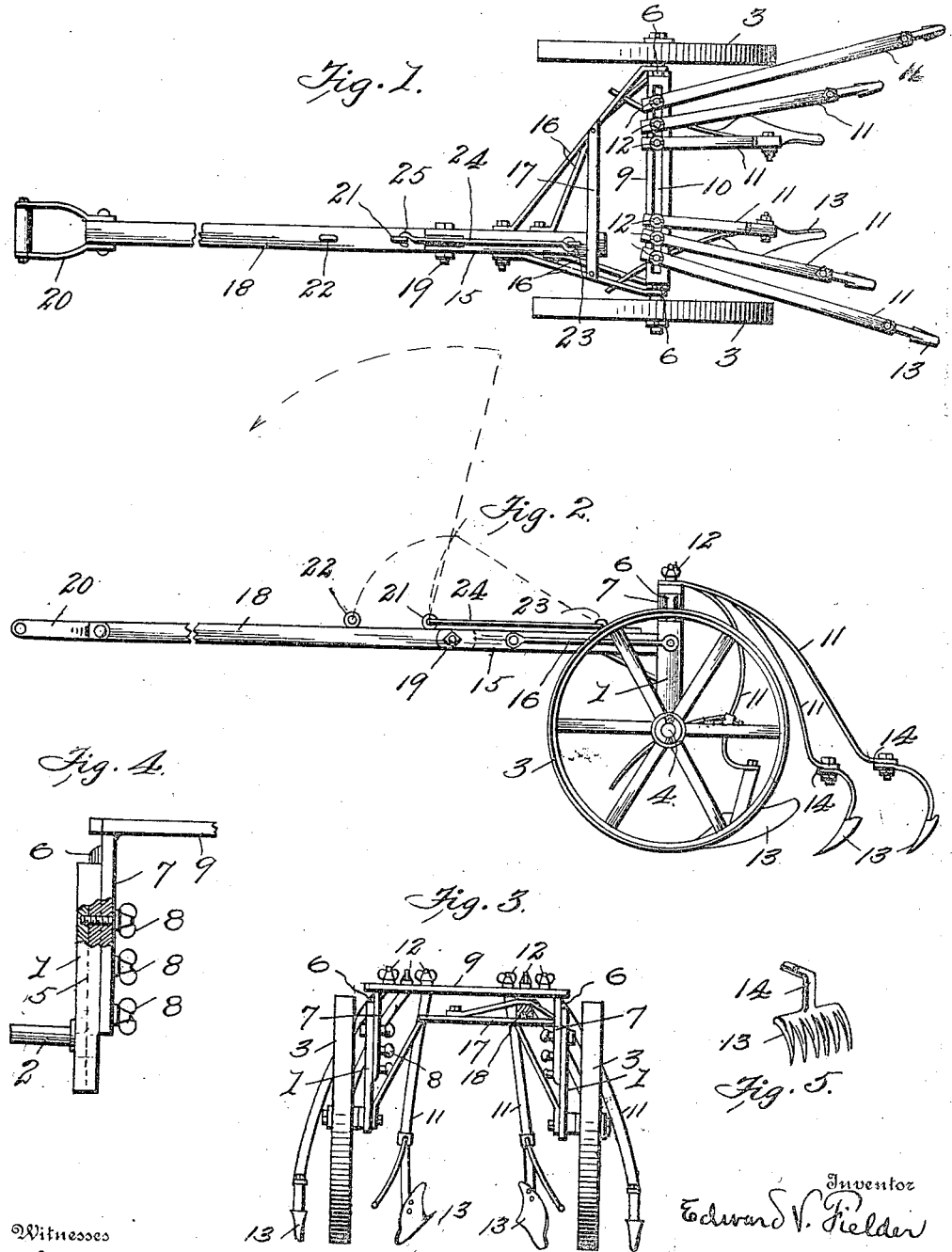

EDWARD V. FIELDER, OF ADELPHIA, NEW JERSEY.

AGRICULTURAL IMPLEMENT.

No. 843,741.　　　Specification of Letters Patent.　　　Patented Feb. 12, 1907.

Application filed July 31, 1906. Serial No. 328,642.

*To all whom it may concern:*

Be it known that I, EDWARD V. FIELDER, a citizen of the United States, residing at Adelphia, in the county of Monmouth and State of New Jersey, have invented a new and useful Agricultural Implement, of which the following is a specification.

This invention relates to new and useful improvements in agricultural implements; and it has particular reference to an agricultural implement embodying a wheeled frame designed to be drawn by hand and in which the tools are interchangeable.

In connection with a device of the above type the invention aims as a primary object to provide novel means for holding said tools in operative or inoperative positions at the option of the user.

The invention aims as a further object to provide a frame embodying vertically-adjustable sections, whereby the tool-shanks may be raised or lowered, as desired.

The invention aims as a further object to provide novel means for varying the angular disposition of said tool-shanks and for increasing or decreasing the distance therebetween in accordance with the condition of use.

The invention aims as a further object to provide an implement of the above type in which the laborer is caused to walk at one side of the row of soil which is being tilled, such means consisting of a forwardly-extending tongue disposed off center with relation to the width of the frame.

The invention finally aims to provide a device which shall be simple in construction, inexpensive to manufacture, and practical and efficient in use.

The detailed construction will appear in the course of the following description, in which reference is made to the accompanying drawings, forming a part of this specification, like numerals designating like parts throughout the several views, wherein—

Figure 1 is a top plan view of an agricultural implement constructed in accordance with my invention. Fig. 2 is a side elevation thereof. Fig. 3 is a front elevation thereof, the tongue being shown in section. Fig. 4 is a plan view, partly in section, of the frame-adjusting mechanism; and Fig. 5 is a detailed perspective view of one of the tools which may be employed, showing in detail the construction of its shank.

Referring specifically to the accompanying drawings, the numeral 1 designates the stationary side bars of the frame. The side bars 1 carry the stud-axles 2, upon which the traction-wheels 3 are mounted, said wheels being retained in position by cotters 4 or other suitable fastening devices. The bars 1 are provided with a central groove 5, (indicated by dotted lines in Fig. 4,) within which is received the projecting rib 6, which is provided upon each of the frame-bars 7. The bars 7 are adjustable vertically with relation to the bars 1. An advantageous adjusting device is shown in Fig. 4, which comprises a plurality of vertically-alined thumb-screws 8, threaded through each of the bars 7 and engaging in a suitably-disposed recess in the bars 1. The bars 7 are bridged at their upper ends by a horizontal cross-bar 9, having a longitudinal slot 10. From the bars 9 are suspended the shanks 11, which carry the gardening implements. The shanks 11 are adjustably disposed on said bars by means of bolt-and-nut connections 12, projected through the slot 10 and engaging the adjacent sides of the bar 9. The shanks 11 carry at their lower ends suitable tools for the various purposes for which the machine is intended, such as hoes, rakes, colters, and the like. These tools are generally designated by the numeral 13 and are formed with angular forwardly-extending shanks 14, which are detachably secured to the lower ends of the shanks 11 by bolt-and-nut fastenings.

As above intimated, the tongue by which the implement is drawn over the hills or rows is disposed off center and at one side. The tongue is illustrated in detail in Figs. 1 and 2 and comprises a stationary section 15, secured to the frame-bars 1 by suitably-arranged obliquely-extending braces 16, the latter being in turn reinforced by a transverse brace 17 and a section 18, pivoted to the section 15, as at 19, said section 18 at its front end being provided with a grip or handle 20. In its body portion the section 18 is provided with a rearward eye 21 and a forward eye 22. To the section 15 there is pivotally secured, by means of an eye connection 23, a rod 24, which terminates in a hooked end 25. The hooked end 25 is designed to be engaged with either the eyes 21 or 22, and such engagement determines the position of the shanks 11 for use. As shown in Figs. 1 and 2, the rod 24 is engaged with the eye 21, and the tools 13 are in position to take into the soil. When, however, it is desired to support the tools above the level of the soil, so that they will not engage the same, the bar 24 is disengaged from the eye 21 and the section 18 is swung as a lever upon its pivot 19 to the dotted-line position of Fig. 2. In such position the rod 24 is engaged with the eye 22, and it will be apparent that when the section 18 is swung downwardly to a horizontal position, the rear part of the frame will be correspondingly moved, so that the shanks 11 are raised and tools 13 carried thereby lifted above the level of the soil.

Having fully described my invention, I claim—

1. An agricultural implement comprising a wheeled frame embodying stationary sections and sections secured thereto in vertically-adjustable relation, a cross-bar uniting said last-named sections and tool-shanks suspended from said cross-bar.

2. An agricultural implement embodying a wheeled frame comprising stationary sections and sections carried thereby and vertically adjustable with relation thereto, a cross-bar uniting said last-named sections and having a slot longitudinally thereof, and tool-shanks having adjustable connection with said cross-bar by fastening devices passing through said slot.

3. A device of the type set forth comprising a wheeled frame, tool-shanks carried thereby, a stationary tongue-section carried thereby, a tongue-section pivoted to said first-named tongue-section, a rod pivotally carried by said first-named tongue-section and adapted to engage said last-named tongue-section, and fastening devices provided in spaced relation upon said pivoted tongue-section for detachable engagement with said rod.

EDWARD V. FIELDER.

Witnesses:
JEREMIAH STILLWELL,
JOHN D. WEBB.